(12) United States Patent
Ikemiya et al.

(10) Patent No.: US 9,285,158 B2
(45) Date of Patent: Mar. 15, 2016

(54) TRAILER REFRIGERATING APPARATUS

(75) Inventors: Makoto Ikemiya, Osaka (JP); Kazuyasu Matsui, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 244 days.

(21) Appl. No.: 13/377,179

(22) PCT Filed: Jun. 4, 2010

(86) PCT No.: PCT/JP2010/003753
§ 371 (c)(1),
(2), (4) Date: Dec. 9, 2011

(87) PCT Pub. No.: WO2010/143390
PCT Pub. Date: Dec. 16, 2010

(65) Prior Publication Data
US 2012/0080162 A1  Apr. 5, 2012

(30) Foreign Application Priority Data
Jun. 10, 2009  (JP) ................ 2009-139512

(51) Int. Cl.
| B60H 1/32 | (2006.01) |
| F25D 23/06 | (2006.01) |
| B60P 3/20 | (2006.01) |
| F25D 19/00 | (2006.01) |

(52) U.S. Cl.
CPC ............ *F25D 23/065* (2013.01); *B60H 1/3232* (2013.01); *B60P 3/20* (2013.01); *F25D 19/003* (2013.01)

(58) Field of Classification Search
CPC ...... B60H 1/32; B60H 1/3222; B60H 1/3229; B60P 3/20

USPC .................................. 62/77, 239, 243, 323.1
See application file for complete search history.

(56) References Cited

U.S. PATENT DOCUMENTS

| 3,995,922 | A | * | 12/1976 | Ohashi ..................... 312/265.5 |
| 4,365,484 | A | * | 12/1982 | Carson et al. .................... 62/239 |
| 4,567,734 | A | * | 2/1986 | Dankowski ..................... 62/186 |
| 2007/0095092 | A1 | * | 5/2007 | Wuerfel .......................... 62/407 |
| 2008/0053029 | A1 | * | 3/2008 | Ricker .......................... 52/592.1 |

FOREIGN PATENT DOCUMENTS

| DE | 10127039 A1 * | 12/2002 |
| EP | 2 436 543 A1 | 4/2012 |
| JP | 7-151453 A | 6/1995 |
| JP | 8-75345 A | 3/1996 |
| JP | 9-251570 A | 9/1997 |
| JP | 10-132454 A | 5/1998 |
| JP | 10-318668 A | 12/1998 |

(Continued)

OTHER PUBLICATIONS

Translation of DE 10127039A1.*

*Primary Examiner* — Jonathan Bradford
*Assistant Examiner* — Elizabeth Martin
(74) *Attorney, Agent, or Firm* — Birch, Stewart, Kolasch & Birch, LLP (57) ABSTRACT

In an attachment portion where a side edge portion of an opening of a trailer and a casing are connected together, a vertically-extending groove is formed in one of the trailer or the casing and a vertically-extending raised portion is formed in the other one of the trailer or the casing so as to be fitted into the groove.

8 Claims, 9 Drawing Sheets

(56) References Cited

FOREIGN PATENT DOCUMENTS

| JP | H11-14248 A | 1/1999 |
| JP | 2001-241835 A | 9/2001 |
| JP | 2005-180718 A | 7/2005 |
| JP | 2005180718 * | 7/2005 | ............ F25D 23/06 |
| JP | 2009-52833 A | 3/2009 |
| SE | 0801202-3 * | 5/2008 |
| WO | WO 2009141127 A2 * | 11/2009 | ............ F25D 23/06 |

* cited by examiner

TRAILER REFRIGERATING APPARATUS

TECHNICAL FIELD

The present invention relates to a trailer refrigerating apparatus for cooling an in-compartment space of a trailer.

BACKGROUND ART

As a refrigerating apparatus for cooling an inside of a compartment, a trailer refrigerating apparatus for cooling an in-compartment space of a trailer of a refrigerated vehicle has been known. Patent Document 1 discloses the trailer refrigerating apparatus of this type.

The trailer refrigerating apparatus includes a casing attached to an opening at a front end of the trailer and a cooling section supported by the casing and cooling the inside of the compartment. The cooling section is configured by an evaporator connected to a refrigerant circuit. That is, in the trailer refrigerating apparatus, refrigerant circulates in the refrigerant circuit to perform a vapor compression refrigeration cycle. Thus, refrigerant is evaporated by absorbing heat from in-compartment air in the evaporator provided inside the compartment, thereby cooling the in-compartment air.

CITATION LIST

Patent Document

PATENT DOCUMENT 1: Japanese Patent Publication No. 2009-052833

SUMMARY OF THE INVENTION

Technical Problem

In the trailer refrigerating apparatus, the casing is attached to the opening of the trailer in order to ensure airtightness of the in-compartment space. Thus, while the refrigerated vehicle travels, stress acts on an attachment portion where the casing and the trailer are connected together. In particular, when the refrigerated vehicle rounds a curve, it is likely to increase stress in a transverse direction of the trailer (right-left width direction of the trailer). Thus, it is required that strength in the transverse direction is particularly improved in an attachment structure in which the opening of the trailer and the casing are connected together, resulting in the complex attachment structure.

The present invention has been made in view of the foregoing, and it is an objective of the present invention to improve strength in a transverse direction in an attachment portion where an opening of a trailer and a casing are connected together, with a relatively-simple structure.

Solution to the Problem

A first aspect of the invention is intended for a trailer refrigerating apparatus including a casing (31) attached to an opening (14) of a trailer (11); and a cooling section (25) supported by the casing (31) and configured to cool air of an in-compartment space (13) of the trailer (11). In an attachment portion (60) where a side edge portion (14a) of the opening (14) of the trailer (11) and the casing (31) are connected together, a vertically-extending groove (61) is formed in one of the trailer (11) or the casing (31), and a vertically-extending raised portion (62) is formed in the other one of the trailer (11) or the casing (31) so as to be fitted into the groove (61).

In the first aspect of the invention, the casing (31) is attached to the opening (14) of the trailer (11), thereby closing the trailer (11). In the in-compartment space (13) of the trailer (11), the cooling section (25) cools an inside of a compartment. In the present invention, in the attachment portion (60) where the side edge portion (14a) of the opening (14) of the trailer (11) and the casing (31) are connected together, the groove (61) is formed in one of the trailer (11) or the casing (31) and the raised portion (62) is formed in the other one of the trailer (11) or the casing (31). Thus, the raised portion (62) is fitted into the groove (61) with the trailer (11) being attached to the casing (31). Consequently, strength of the attachment portion (60) is improved. The raised portion (62) and the groove (61) vertically extend along the side edge portion (14a) of the opening (14) of the trailer (11). Thus, in the attachment portion (60), strength in a transverse direction is particularly improved.

In addition, formation of the raised portion (62) and the groove (61) in the attachment portion (60) avoids cool air of the in-compartment space (13) of the trailer (11) from being released to an outside of the trailer (11) (outside of the compartment) through a clearance of the attachment portion (60). That is, the raised portion (62) and the groove (61) of the present invention also function as a sealing section configured to prevent cool air leakage.

A second aspect of the invention is intended for the trailer refrigerating apparatus of the first aspect of the invention, in which, in one or both of an attachment portion (70) where an upper edge portion (17) of the opening (14) of the trailer (11) and the casing (31) are connected together and an attachment portion (80) where a lower edge portion (18) of the opening (14) of the trailer (11) and the casing (31) are connected together, a horizontally-extending groove (71) is formed in one of the trailer (11) or the casing (31), and a horizontally-extending raised portion (72) is formed in the other one of the trailer (11) or the casing (31) so as to be fitted into the groove (71).

In the second aspect of the invention, in one or both of the attachment portion (70) where the upper edge portion (17) of the opening (14) of the trailer (11) and the casing (31) are connected together and the attachment portion (80) where the lower edge portion (18) of the opening (14) of the trailer (11) and the casing (31) are connected together, the groove (71) is formed in one of the trailer (11) or the casing (31) and the raised portion (72) is formed in the other one of the trailer (11) or the casing (31). The raised portion (72) is fitted into the groove (71) with the trailer (11) being attached to the casing (31). Thus, strength of the attachment portion (70, 80) is improved. The raised portion (72) and the groove (71) horizontally extend along the upper edge portion (17) or the lower edge portion (18) of the opening (14) of the trailer (11). Thus, in the attachment portion (70, 80), strength in a longitudinal direction is particularly improved.

In addition, formation of the raised portion (72) and the groove (71) in the attachment portion (70, 80) avoids cool air of the in-compartment space (13) of the trailer (11) from being released to the outside of the trailer (11) (outside of the compartment) through a clearance of the attachment portion (70, 80). That is, the raised portion (72) and the groove (71) of the present invention also function as a sealing section configured to prevent cool air leakage.

A third aspect of the invention is intended for the trailer refrigerating apparatus of the first or second aspect of the invention, which further includes a sealing member (63, 73) provided between the groove (61, 71) and the raised portion (62, 72).

In the third aspect of the invention, in the attachment portion (60, 70, 80) where the trailer (11) and the casing (31) are connected together, the sealing member (63, 73) is provided between the groove (61, 71) and the raised portion (62, 72). The sealing member (63, 73) seals a clearance between the side edge portion (14a), the upper edge portion (17), or the lower edge portion (18) of the opening (14) of the trailer (11) and the casing (31). This reduces leakage of cool air of the in-compartment space (13) of the trailer (11) to the outside of the trailer (11) (outside of the compartment) through such a clearance.

A fourth aspect of the invention is intended for the trailer refrigerating apparatus of any one of the first to third aspects of the invention, which further includes a fastening member (16) provided in the attachment portion (60, 70, 80) where the opening (14) of the trailer (11) and the casing (31) are connected together and configured to fasten the opening (14) and the casing (31).

In the fourth aspect of the invention, the opening (14) of the trailer (11) and the casing (31) are fixed to each other by the fastening member (16).

A fifth aspect of the invention is intended for the trailer refrigerating apparatus of the fourth aspect of the invention, in which, in the attachment portion (60, 70, 80), two grooves (61, 71) and two raised portions (62, 72) fitted into the two grooves (61, 71) are provided, and the fastening member (16) is provided between the two grooves (61, 71).

In the fifth aspect of the invention, the fastening member (16) is provided between the two grooves (61, 71) formed in the attachment portion (60, 70, 80). When the opening (14) of the trailer (11) and the casing (31) are fixed to each other by the fastening member (16), it is likely that a clearance between the opening (14) and the casing (31) is broadened around the fastening member (16). However, in the present invention, since the grooves (61, 71) are formed on both sides of the fastening member (16), the grooves (61, 71) and the raised portions (62, 72) seal the both sides of the fastening member (16). This avoids cool air of the in-compartment space (13) from escaping to the outside of the trailer (11) through the clearance around the fastening member (16).

A sixth aspect of the invention is intended for the trailer refrigerating apparatus of any one of the first to fifth aspects of the invention, in which the groove (61, 71) is formed in the trailer (11), and the raised portion (62, 72) is formed in the casing (31).

In the sixth aspect of the invention, the groove (61, 71) is formed in the opening (14) of the trailer (11), and the raised portion (62, 72) is formed in the casing (31). Thus, when the casing (31) is attached to the opening (14) of the trailer (11), the raised portion (62, 72) of the casing (31) is fitted into the groove (61) of the opening (14).

Advantages of the Invention

According to the present invention, in the attachment portion (60) where the opening (14) of the trailer (11) and the casing (31) are connected together, the vertically-extending grooves (61) and the raised portions (62) fitted into the groove (61) are formed. Thus, in a state in which the casing (31) is attached to the opening (14) of the trailer (11), the strength in the transverse direction can be enhanced by fitting the raised portion (62) into the groove (61). Consequently, an attachment structure can be simplified, in which the opening (14) of the trailer (11) and the casing (31) are connected together.

In addition, by fitting the raised portion (62) into the groove (61), a sealing property in the side edge portion (14a) of the trailer (11) can be improved. This reduces the leakage of cool air of the in-compartment space (13) to the outside of the compartment, thereby improving an energy saving property of the trailer refrigerating apparatus.

Further, by fitting the raised portion (62) into the groove (61), a relative position between the trailer (11) and the casing (31) is easily set. Thus, an operation when the casing (31) is attached to the trailer (11) is facilitated.

In the second aspect of the invention, the horizontally-extending grooves (71) and the horizontally-extending raised portions (72) are formed in the attachment portion (70, 80) on a side closer to the upper edge portion (17) or the lower edge portion (18) of the opening (14) of the trailer (11), and the raised portion (72) is fitted into the groove (71). This also improves the strength in the longitudinal direction in the attachment portion (70, 80). In addition, a sealing property of the upper edge portion (17) or the lower edge portion (18) can be improved, thereby further improving the energy saving property of the trailer refrigerating apparatus.

Particularly in the third aspect of the invention, since the sealing member (63, 73) is provided between the groove (61, 71) and the raised portion (62, 72), the leakage of cool air of the in-compartment space (13) to the outside of the compartment can be effectively reduced.

In the fourth aspect of the invention, the trailer (11) and the casing (31) are fastened by the fastening member (16), thereby improving attachment strength between the trailer (11) and the casing (31). In the present invention, since stiffness in the transverse direction is improved by fitting the raised portion (62, 72) into the groove (61, 71), the number of the fastening members (16) can be reduced.

In the fifth aspect of the invention, in the opening (14) of the trailer (11), the groove (61, 71) and the raised portion (62, 72) are provided on each side of the fastening member (16), thereby further improving the sealing property of the opening (14).

In the sixth aspect of the invention, since the raised portion (62, 72) is formed in the casing (31), processing of the raised portion (62, 72) is facilitated as compared to, e.g., a case where the raised portion (62, 72) is formed in the trailer (11).

DESCRIPTION OF EMBODIMENTS

An embodiment of the present invention will be described below in detail with reference to the drawings.

Figure 1:
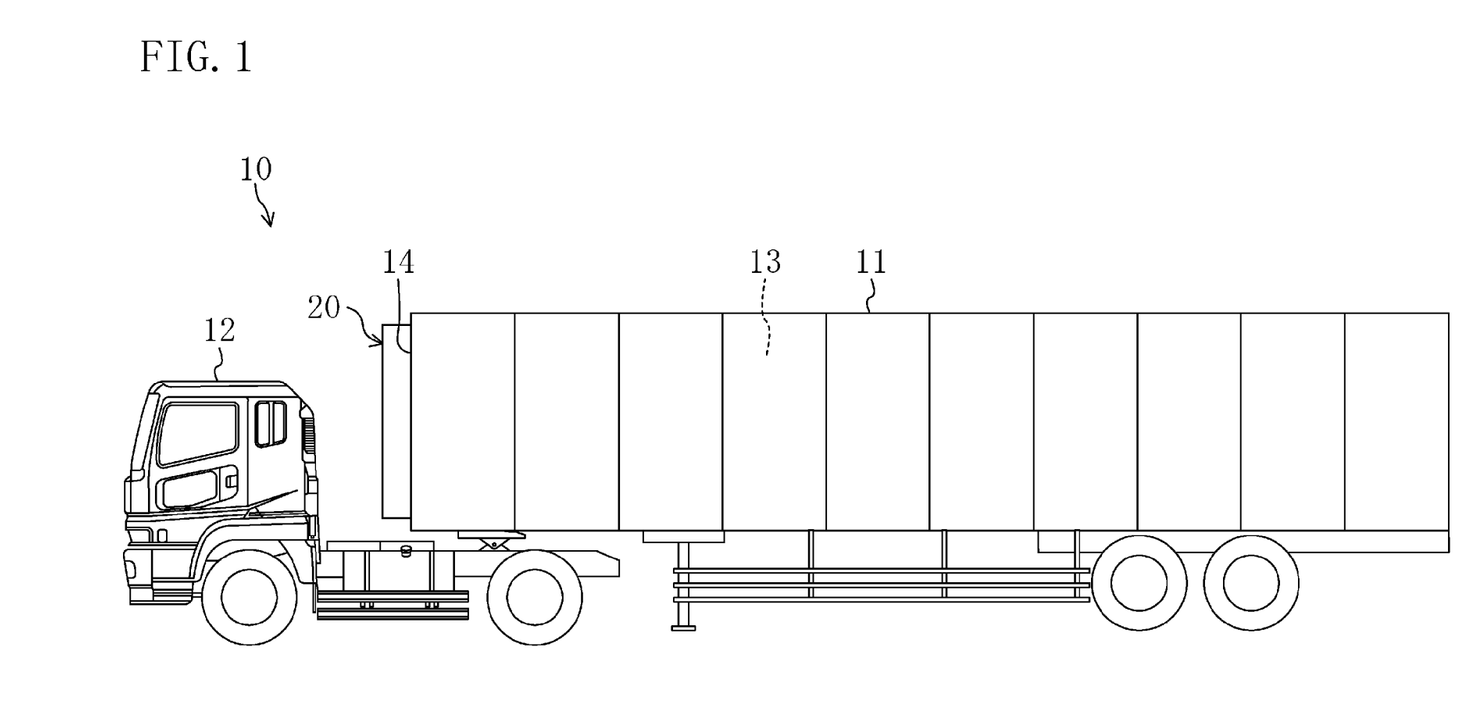
FIG. 1 is a view of an entire configuration of a refrigerated vehicle and a trailer refrigerating apparatus.

As illustrated in FIG. 1, a trailer refrigerating apparatus (20) of the present embodiment is mounted in a refrigerated vehicle (10) for transporting frozen food, fresh food, etc. by road or rail. The refrigerated vehicle (10) includes a trailer (11) in which freight such as frozen food is stored, and a tractor (12) for towing the trailer (11).

Figure 3:
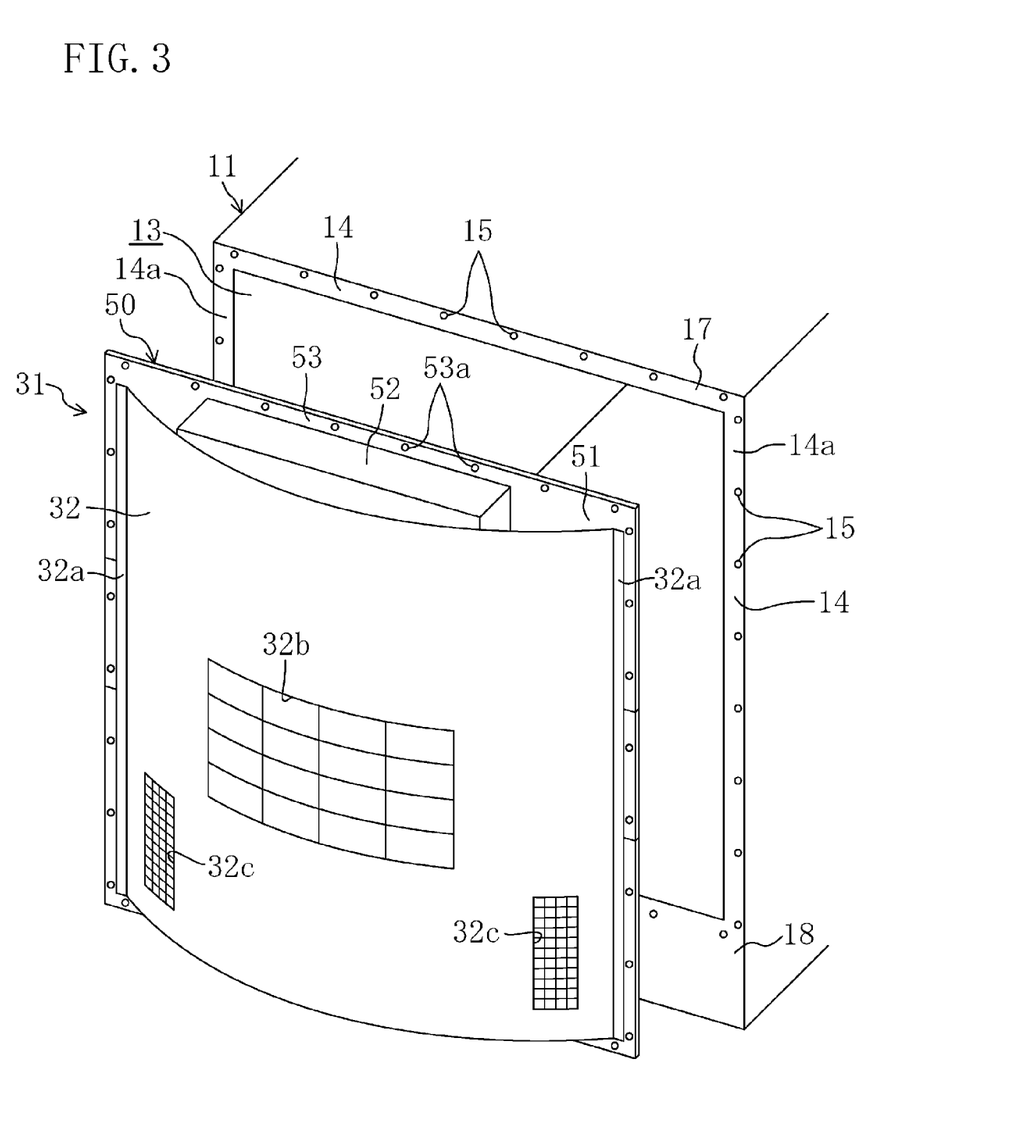
FIG. 3 is a perspective view illustrating an entire configuration of an opening of a trailer and the trailer refrigerating apparatus.

The trailer (11) is formed in an elongated rectangular parallelepiped box shape extending in a front-back direction and opening at a front end. An in-compartment space (13) is formed inside the trailer (11), and frozen food, fresh food, etc. are stored in the in-compartment space (13). As illustrated in FIG. 3, a rectangular frame-shaped opening (14) is formed at the front end of the trailer (11). A plurality of screw fixing portions (15) for attaching the trailer refrigerating apparatus (20) are formed in a front end surface of the opening (14). For example, eight of the plurality of screw fixing portions (15) are arranged at equal intervals in each of four sides of the opening (14).

Configuration of Trailer Refrigerating Apparatus

Figure 2:
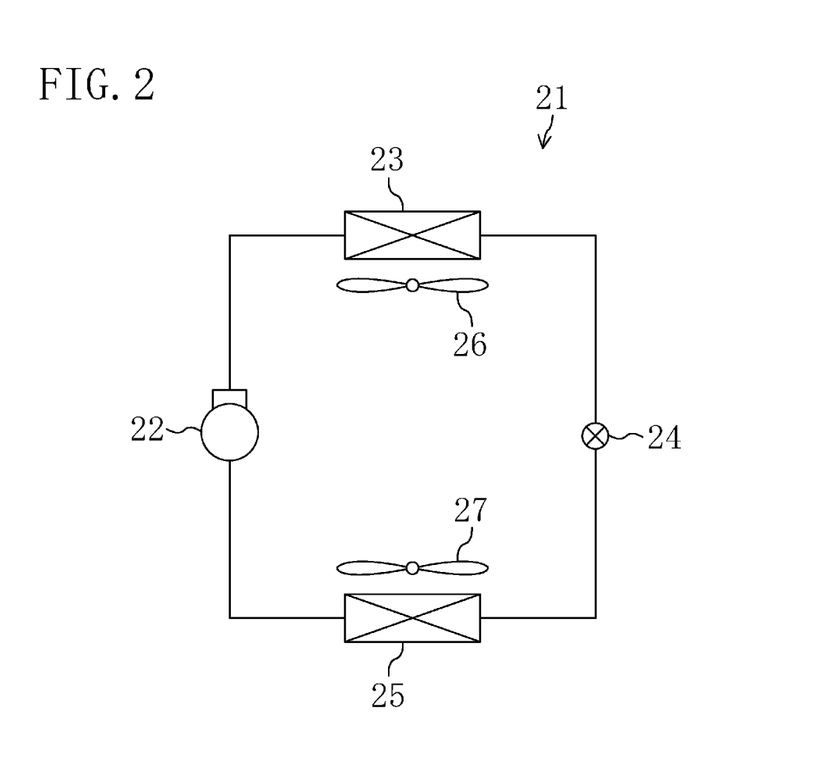
FIG. 2 is a schematic configuration diagram of a refrigerant circuit of the trailer refrigerating apparatus.

The trailer refrigerating apparatus (20) serves as a cooling apparatus for cooling air in the in-compartment space (13) of the refrigerated vehicle (10). As illustrated in FIG. 2, the trailer refrigerating apparatus (20) includes a refrigerant circuit (21) filled with refrigerant. In the refrigerant circuit (21), a compressor (22), a condenser (23), an expansion valve (24), and an evaporator (25) are connected together. In the refrigerant circuit (21), refrigerant circulates to perform a vapor compression refrigeration cycle. An outside-compartment fan (26) is provided near the condenser (23). In the condenser (23), heat is exchanged between outside-compartment (outdoor) air delivered by the outside-compartment fan (26) and refrigerant. An in-compartment fan (27) is provided near the evaporator (25). In the evaporator (25), heat is exchanged between in-compartment air delivered by the in-compartment fan (27) and refrigerant. The evaporator (25) serves as a cooling section for cooling air in the in-compartment space (13) of the trailer (11).

As illustrated in FIGS. 3-6, the trailer refrigerating apparatus (20) includes a casing unit (31) attached to the opening (14) of the trailer (11). The casing unit (31) includes a front cover (32), an outside-compartment casing (50), and an in-compartment casing (33).

<Front Cover>

The front cover (32) is detachable from a front surface of the outside-compartment casing (50). The front cover (32) is an arched-plate-shaped member which is curved so that a middle portion of the front cover (32) in a width direction thereof (right-left direction as viewed in FIG. 3) protrudes toward the front. Side portions (32a) at both ends of the front cover (32) in the width direction thereof are held by the outside-compartment casing (50). This forms machine chambers (35, 36) in each of which various components (details will be described later) are accommodated, between a rear surface of the front cover (32) and the front surface of the outside-compartment casing (50).

A single middle inlet (32b) and two side inlets (32c) are provided in the front cover (32). The middle inlet (32b) is formed in substantially the center of the front cover (32). One of the side inlets (32c) is formed closer to a bottom and a left end of the front cover (32), and the other side inlet (32c) is formed closer to the bottom and a right end of the front cover (32).

<Outside-Compartment Casing>

The outside-compartment casing (50) is provided outside the trailer (11). The outside-compartment casing (50) is made of an aluminum material. The outside-compartment casing (50) includes a square plate-shaped base (51) and a protrusion (52) formed in an upper portion of the base (51) (see, e.g., FIGS. 3, 4, and 6).

Figure 4:
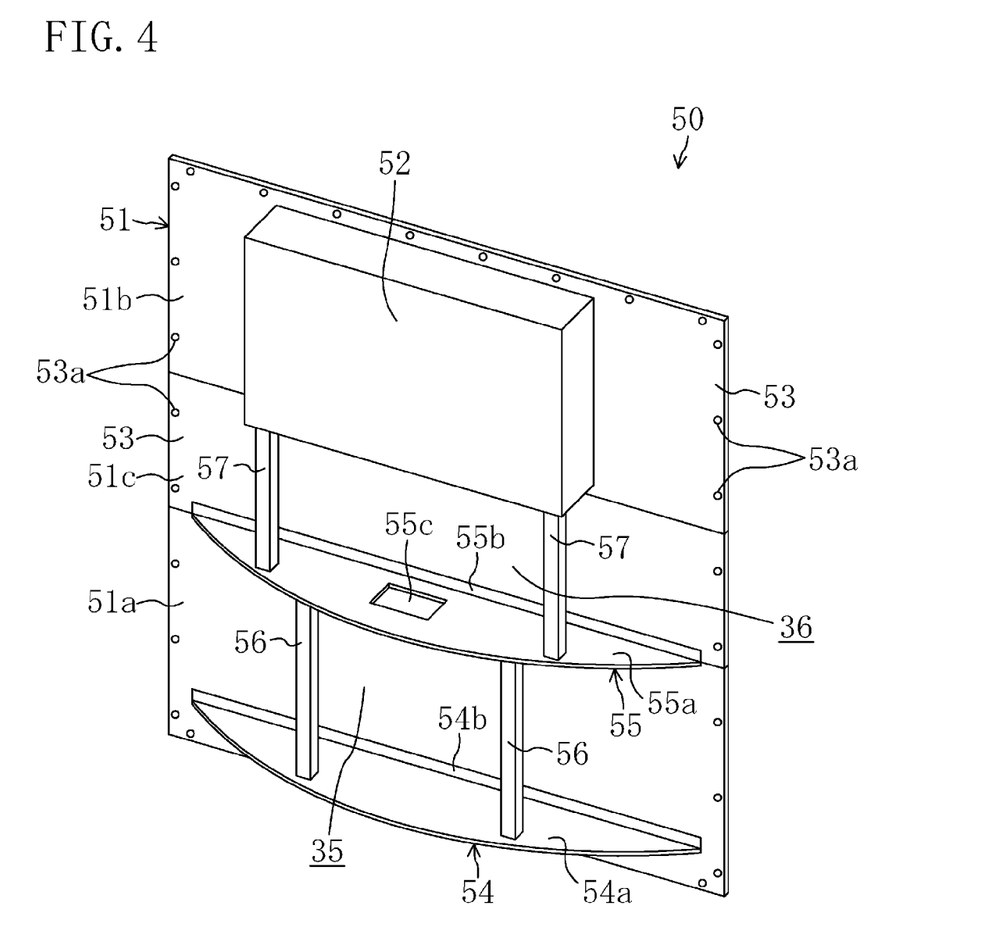
FIG. 4 is a perspective view of an outside-compartment casing.

The base (51) is configured by connecting three plate-shaped separate bodies (51a, 51b, 51c) together in the vertical direction. That is, the base (51) includes the lower base portion (51a) provided closer to a bottom of the base (51), the upper base portion (51b) provided closer to a top of the base (51), and the middle base portion (51c) positioned between the lower base portion (51a) and the upper base portion (51b).

A plurality of bolt holes (53a) into each of which a bolt (16) is inserted are formed in an outer edge portion (53) of the base (51). For example, eight of the plurality of bolt holes (53a) are arranged at equal intervals in each of four sides of the outer edge portion (53) of the base (51). The bolts (16) each inserted into the bolt hole (53a) are screwed in the screw fixing portions (15) in a state in which the outer edge portion (53) of the base (51) and the opening (14) of the trailer (11) closely contact each other, thereby fixing the outside-compartment casing (50) to the trailer (11).

In a state in which the outside-compartment casing (50) is fixed to the trailer (11), the opening (14) of the trailer (11) is closed by the outside-compartment casing (50). That is, the outside-compartment casing (50) functions as a closing member of the opening (14) of the trailer (11). In addition, in the state in which the outside-compartment casing (50) is fixed to the trailer (11), the opening (14) of the trailer (11) is reinforced by the outer edge portion (53) of the outside-compartment casing (50). That is, the outside-compartment casing (50) also functions as a reinforcing member of the opening (14) of the trailer (11).

The protrusion (52) is made of an aluminum material so as to be integrally formed with the base (51), and protrudes from the base (51) toward the front. The protrusion (52) is formed in a rectangular parallelepiped box shape which has flat front and rear surfaces and opens on a rear surface side (see FIG. 6). Note that the protrusion (52) may be made of, e.g., a resin material, and may be integrally connected to the base (51).

The outside-compartment casing (50) includes a lower plate (54) and an upper plate (55). The lower plate (54) is provided closer to a lower end of the base (51), and the upper plate (55) is provided in a middle portion of the base (51) in the vertical direction (provided between the lower plate (54) and the protrusion (52)). Each of the plates (54, 55) includes an arch-shaped support plate portion (54a, 55a). The support plate portion (54a, 55a) defines an arc-shaped surface on a front side, and defines a flat surface along a front surface of the base (51) on a rear side. Each of the plates (54, 55) includes a bent portion (54b, 55b) formed by upwardly bending the support plate portion (54a, 55a) at a rear end thereof. The bent portion (54b, 55b) is formed in a plate shape extending in the right-left direction. The bent portion (54b, 55b) is fixed to the base (51) with rivets, thereby fixing each of the plates (54, 55) to the base (51). A communication port (55c) is provided in a middle portion of the support plate portion (55a) of the upper plate (55) in the right-left direction.

In the state in which the front cover (32) is attached to the outside-compartment casing (50), the first machine chamber (35) is defined between the lower plate (54) and the upper plate (55). In addition, the second machine chamber (36) is defined above the upper plate (55). The first machine chamber (35) and the second machine chamber (36) are communicated with each other through the communication port (55c) of the upper plate (55). In addition, the first machine chamber (35) is communicated with the two side inlets (32c), and the second machine chamber (36) is communicated with the middle inlet (32b).

The outside-compartment casing (50) includes two lower pillars (56) and two upper pillars (57). The lower pillars (56) are interposed between the lower plate (54) and the upper plate (55). The upper pillars (57) are interposed between the upper plate (55) and the protrusion (52). Each of the pillars (56, 57) is made of an aluminum material, and is formed in a vertically-extending prism shape.

Figure 5:
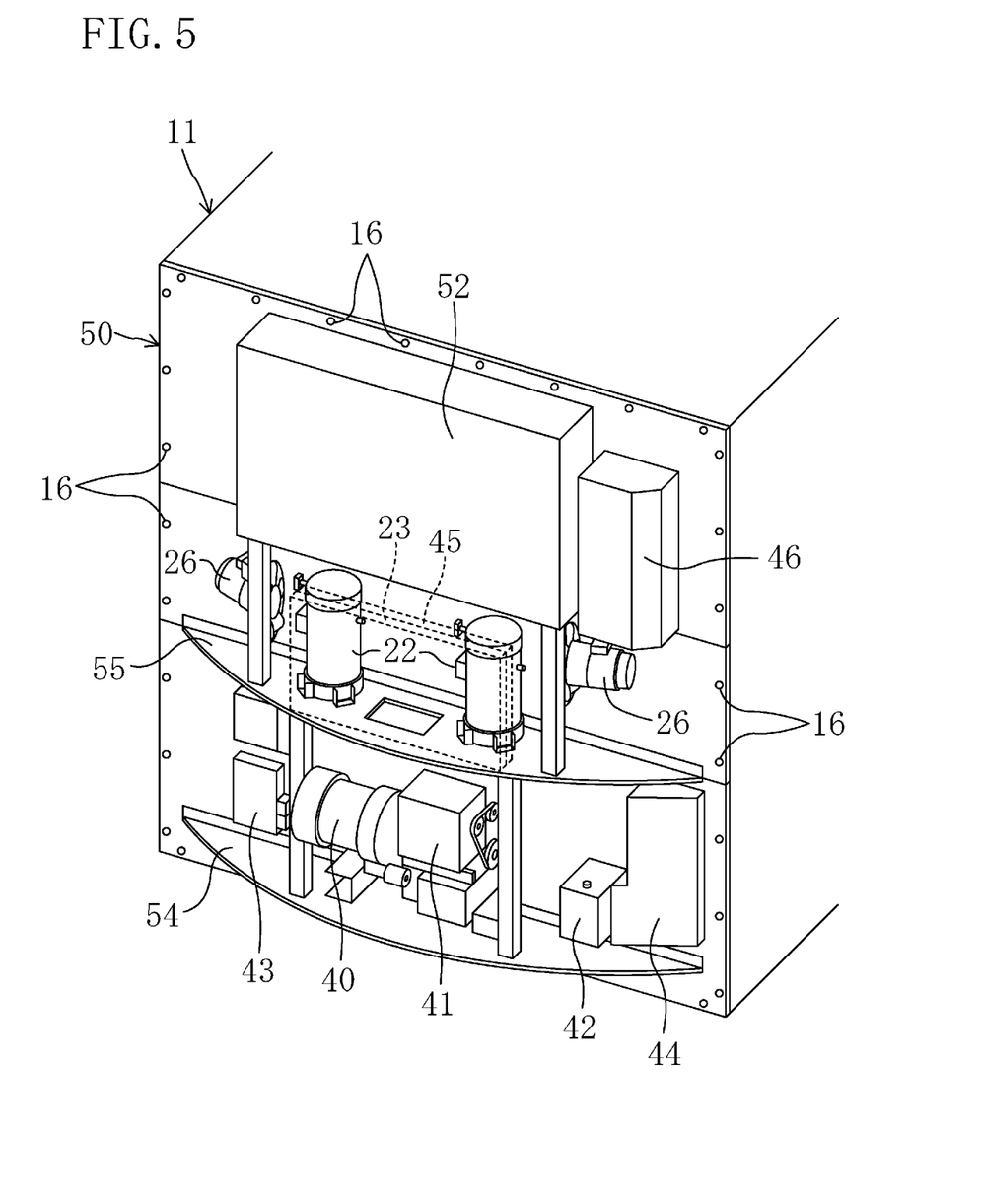
FIG. 5 is a perspective view illustrating the trailer refrigerating apparatus in a state in which a front cover is detached.

As illustrated in FIG. 5, in the first machine chamber (35), a generator (40), an engine (41), a battery (42), and a plurality of electric component boxes (43, 44) are provided. Specifically, in the first machine chamber (35), the generator (40) and the engine (41) are mounted in a middle position of the lower plate (54) in the right-left direction. The engine (41) is for driving the generator (40), and the generator (40) is for generating power for driving the compressors (22) etc. In addition, in the first machine chamber (35), the first electric component box (43) is provided in a space at the left of the generator (40), and the second electric component box (44) is provided in a space at the right of the engine (41).

In the second machine chamber (36), the two compressors (22), the condenser (23), a radiator (45), the two outside-compartment fans (26), and an electric component box (46) are provided. Specifically, in the second machine chamber (36), the two compressors (22) are mounted in a middle position of the upper plate (55) in the right-left direction. In addition, the radiator (45) and the condenser (23) are arranged in the front of the compressors (22). The condenser (23) is arranged so as to extend between the two upper pillars (57). The middle inlet (32b) of the front cover (32) is positioned in the front of the condenser (23). The radiator (45) is arranged in the rear of the condenser (23), and serves as an air-cooling radiator for dissipating heat from the engine (41).

The two outside-compartment fans (26) are arranged so as to sandwich the two compressors (22). One of the two outside-compartment fans (26) is arranged closer to a left end of the upper plate (55), and the other outside-compartment fan (26) is arranged closer to a right end of the upper plate (55). The outside-compartment fan (26) is a so-called "propeller fan," and a rotation shaft thereof extends in the right-left direction. A propeller is connected to an end portion of the rotation shaft of the outside-compartment fan (26) closer to the compressor (22), and a motor is connected to an opposite end portion. In the second machine chamber (36), the third electric component box (46) is provided in a space closer to an upper right portion of the second machine chamber (36).

<In-Compartment Casing>

Figure 6:
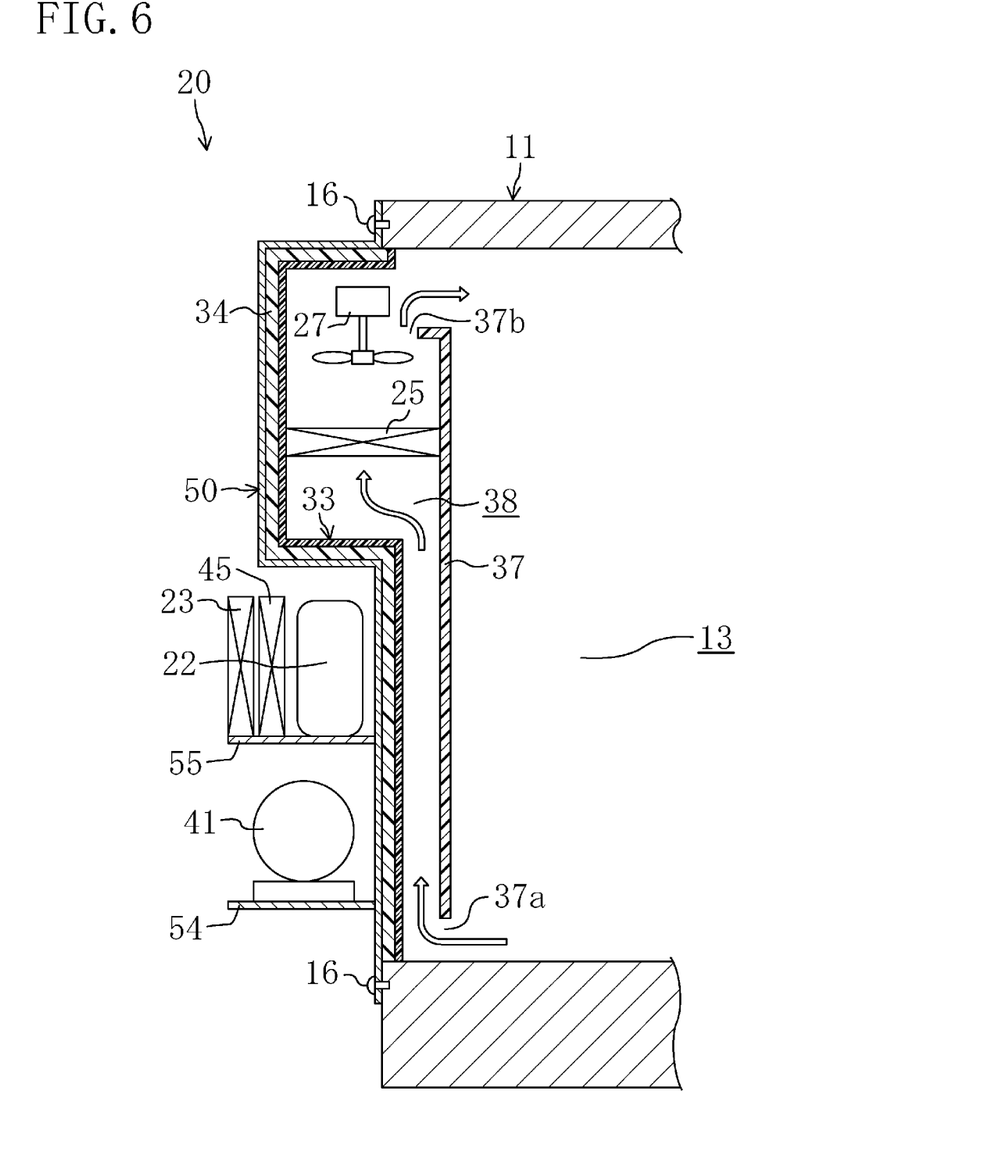
FIG. 6 is a longitudinal sectional view illustrating a schematic configuration of the trailer refrigerating apparatus.

As illustrated in FIG. 6, the in-compartment casing (33) is provided on a rear surface side of the outside-compartment casing (50) so as to face the in-compartment space (13) of the trailer (11). The in-compartment casing (33) is made of, e.g., a glass fiber reinforced plastic (FRP) material. Note that the in-compartment casing (33) may be made of, e.g., other rein material or a metal material. The in-compartment casing (33) has a shape defined along a rear surface of the outside-compartment casing (50).

A predetermined clearance is formed between a front surface of the in-compartment casing (33) and the rear surface of the outside-compartment casing (50), and a thermal insulator (34) is formed between the in-compartment casing (33) and the outside-compartment casing (50). After an enclosed space is formed between the outside-compartment casing (50) and the in-compartment casing (33), the enclosed space is filled with foamed resin, thereby integrally forming the thermal insulator (34) with the casing unit (31).

A partition (37) is attached on a rear surface side of the in-compartment casing (33). The partition (37) is arranged so as to apart from each of a rear surface of the in-compartment casing (33), an upper inner wall of the trailer (11), and a lower inner wall of the trailer (11) with a predetermined distance. This forms an inlet port (37a) below the partition (37), and forms an outlet port (37b) above the partition (37). In addition, an internal air flow path (38) is formed between the in-compartment casing (33) and the partition (37) so as to extend between the inlet port (37a) and the outlet port (37b).

In the internal air flow path (38), the evaporator (25) and the in-compartment fan (27) are provided. On the rear surface side of the protrusion (52), the evaporator (25) is arranged so as to extend between the in-compartment casing (33) and the partition (37), and is supported by the in-compartment casing (33). The in-compartment fan (27) is provided above the evaporator (25).

<Attachment Structure of Casing>

Figure 7:
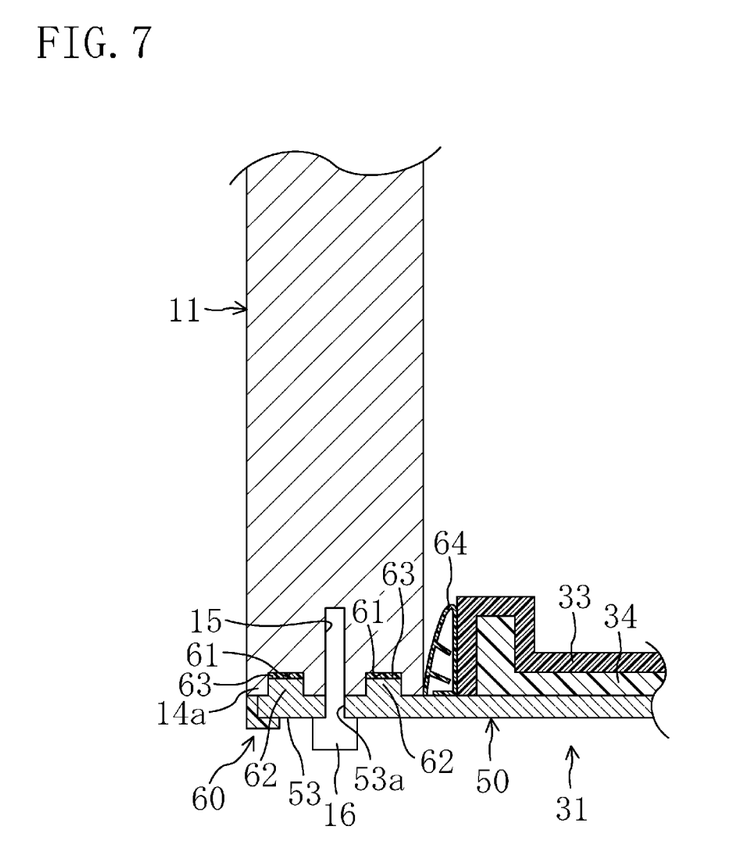
FIG. 7 is a cross-sectional view near a side edge portion of the opening of the trailer.

As described above, in the trailer refrigerating apparatus (20) of the present embodiment, the casing unit (31) is attached to the opening (14) of the trailer (11). An attachment structure in which the casing unit (31) and the opening (14) of the trailer (11) are connected together will be described in detail with reference to FIG. 7. Note that FIG. 7 is an enlarged view of a horizontal section near a side edge portion (14a) (see FIG. 2) on each side of the trailer (11) in a right-left width direction thereof.

In an attachment portion (60) where the side edge portion (14a) on each side of the opening (14) of the trailer (11) and the casing unit (31) are connected together, two grooves (longitudinal grooves) (61) are formed in the trailer (11), and two raised portions (62) are formed in the casing unit (31).

The groove (61) extends from an upper edge portion (17) to a lower edge portion (18) of the opening (14) of the trailer (11) in the vertical direction, and is formed so as to have a rectangular horizontal section. The two grooves (61) extend parallel to each other with a predetermined clearance.

On the other hand, in the outside-compartment casing (50) of the casing unit (31), the two raised portions (longitudinal raised portions) (62) to be fitted into the grooves (61) are formed. The raised portion (62) extends from an upper end to a lower end of the outside-compartment casing (50) in the vertical direction, and is formed so as to have a rectangular horizontal section. The two raised portions (62) extend parallel to each other with a predetermined clearance. That is, the raised portion (62) has a shape corresponding to each of the grooves (61) of the trailer (11), and is fitted into the groove (61) when the casing unit (31) and the opening (14) of the trailer (11) are attached to each other.

The bolts (16) are provided in the middle between two pairs of the groove (61) and the raised portion (62). That is, the two grooves (61) or the two raised portions (62) extend in an arrangement direction of the plurality of vertically-arranged bolts (16) so as to sandwich the plurality of bolts (16).

A sealing member (longitudinal sealing member) (63) is interposed between each of the grooves (61) and each of the raised portions (62) with the casing unit (31) being attached to the opening (14) of the trailer (11). As the sealing member (63), e.g., packing or a silicon seal is used. The sealing member (63) prevents cool air of the in-compartment space (13) of the trailer (11) from leaking to an outside of the compartment through a clearance between the side edge portion (14a) of the trailer (11) and the outside-compartment casing (50).

In the in-compartment space (13), a sealing rubber (64) is interposed between a side end portion of the in-compartment casing (33) and the side edge portion (14a) of the opening (14) of the trailer (11) as a sealing member. Further, silicon is applied to a contact portion between a side end of the outside-compartment casing (50) and the side edge portion (14a) of the trailer (11). In the foregoing manner, in the attachment portion (60), leakage of cool air from the in-compartment space (13) to the outside of the compartment is prevented.

Operation

Next, an operation of the trailer refrigerating apparatus (20) will be described with reference to FIGS. 6 and 7.

When the generator (40) is driven by the engine (41), power is generated in the generator (40). Such power is supplied to the compressors (22), the outside-compartment fans (26), and the in-compartment fan (27). In the refrigerant circuit (21), the compressors (22) are operated to perform the refrigeration cycle.

Specifically, refrigerant compressed in the compressors (22) flows through the condenser (23). In the condenser (23), the refrigerant is condensed by dissipating heat to outside-compartment air. The pressure of the condensed refrigerant is reduced when the refrigerant passes through the expansion valve (24), and the refrigerant after the pressure reduction flows through the evaporator (25). In the evaporator (25), the refrigerant is evaporated by absorbing heat from in-compartment air. The evaporated refrigerant is re-compressed in the compressors (22).

When the in-compartment fan (27) is operated, in-compartment air of the in-compartment space (13) is sucked into the internal air flow path (38) through the inlet port (37a). The air sucked into the internal air flow path (38) upwardly flows and passes through the evaporator (25). In the evaporator (25), the in-compartment air is cooled by exchanging heat with refrigerant. The in-compartment air cooled in the evaporator (25) flows in an in-compartment space (S) through the outlet port (37b), and is used for refrigerating/freezing freight etc.

Figure 8:
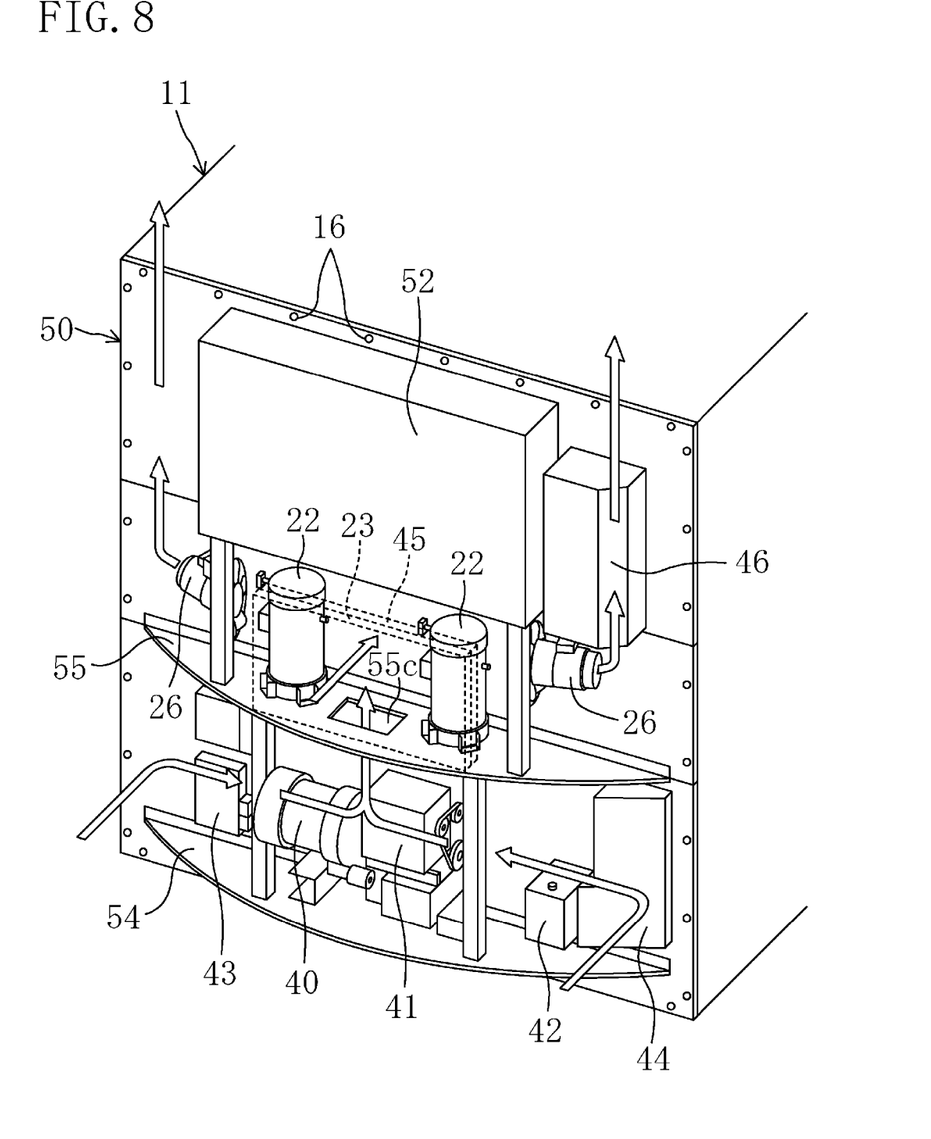
FIG. 8 is a perspective view illustrating the trailer refrigerating apparatus in the state in which the front cover is detached, and illustrates a flow of outdoor air.

Meanwhile, when the outside-compartment fan (26) is operated, outside-compartment (outdoor) air is sucked into the machine chambers (35, 36). Specifically, the outside-compartment air is sucked through the two side inlets (32c) and the middle inlet (32b) of the front cover (32). The air introduced into the first machine chamber (35) through the left one of the two side inlets (32c) passes around the first electric component box (43), and then is sent to the vicinity of the generator (40) and the engine (41). Meanwhile, the air introduced into the first machine chamber (35) through the right one of the two side inlets (32c) passes around the second electric component box (44), and then is sent to the vicinity of the engine (41) and the generator (40). When the air flows near the engine (41) and the generator (40), the engine (41) and the generator (40) are cooled by the air. The air used for cooling the engine (41) and the generator (40) upwardly flows through the communication port (55c), and is sent to the second machine chamber (36).

The air sucked into the second machine chamber (36) through the middle inlet (32b) passes through the condenser (23). In the condenser (23), refrigerant is condensed by dissipating heat to the outside-compartment air. The air passing through the condenser (23) flows around the radiator (45), and is used for cooling the radiator (45). Then, such air joins the air passing through the communication port (55c).

The air joined together in the second machine chamber (36) is distributed in right and left directions so as to flow around the two compressors (22). The air distributed in the left direction passes through an opening at an upper end of the front cover (32), and then is released to an outside of the outside-compartment casing (50). The air distributed in the right direction passes through the third electric component box (46). Then, such air passes through the opening at the upper end of the front cover (32), and is released to the outside of the outside-compartment casing (50).

Advantages of the Embodiment

In the foregoing embodiment, in the attachment portion (60) where the side edge portion (14a) on each side of the opening (14) of the trailer (11) and the outside-compartment casing (50) are connected together, the raised portion (62) is fitted into the groove (61). Thus, in the foregoing embodiment, strength can be improved against stress acting in a transverse direction of the trailer (11) while the refrigerated vehicle (10) travels (particularly when the refrigerated vehicle (10) rounds a curve). Consequently, an attachment structure for attaching the casing unit (31) to the trailer (11) can be simplified by, e.g., reducing the number of bolts (16).

In addition, by fitting the raised portion (62) into the groove (61), it is less likely that cool air of the in-compartment space (13) leaks to the outside of the compartment. Further, the sealing member (63) is formed between the groove (61) and the raised portion (62), thereby improving a sealing effect against cool air leakage. Further, the groove (61) is formed on each of the right and left of the bolt (16). Thus, even if a clearance around the bolt (16) is broadened in association with fastening of the bolt (16), the cool air leakage can be prevented by the groove (61) and the raised portion (62). In addition, since the sealing member (packing (63)) between the groove (61) and the raised portion (62) is compressed into a compact mass in association with the fastening of the bolt (16), the sealing effect by the sealing member (63) can be further improved.

The groove (61) and the raised portion (62) function as a positioning section of the casing unit (31) and the trailer (11). That is, when the casing unit (31) is attached to the trailer (11), the raised portion (62) is fitted into the groove (61) to adjust a position of the bolt hole (53a) of the outside-compartment casing (50) and a position of the screw fixing portion (15) of the trailer (11). This allows the easy fastening of the bolt (16).

<<Other Embodiment>>

The foregoing embodiment may have the following configurations.

Figure 9:
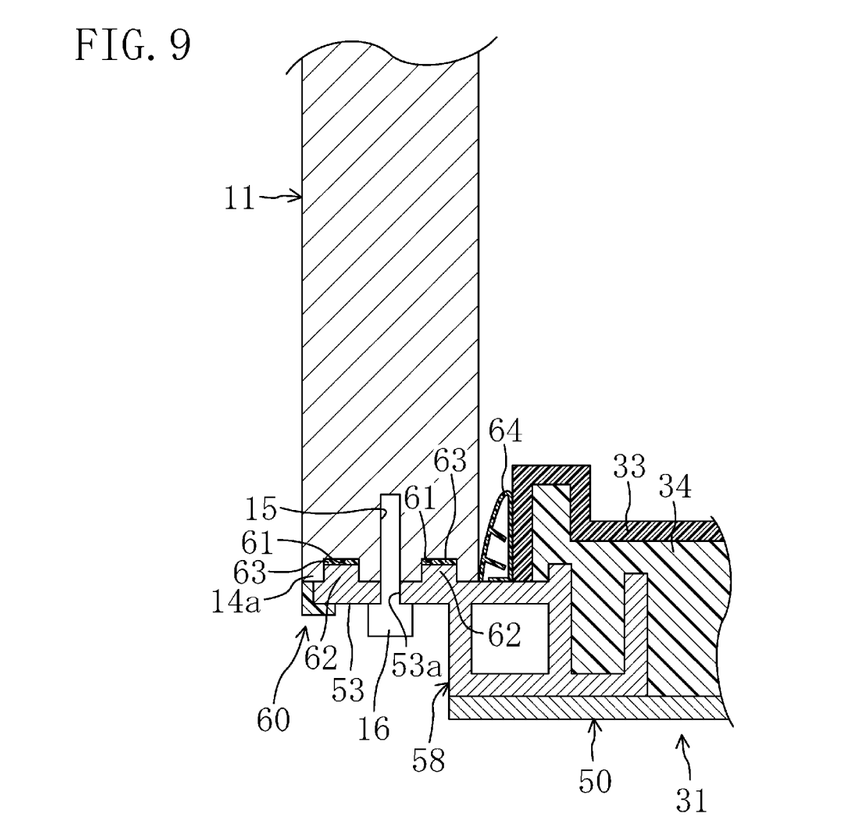
FIG. 9 is a cross-sectional view near a side edge portion of an opening of a trailer in a trailer refrigerating apparatus of a variation.

As the casing unit (31) of the foregoing embodiment, a structure of a variation illustrated in FIG. 9 may be employed. That is, in the casing unit (31), the base (51) of the outside-compartment casing (50) is a body separated from the outer edge portion (53) and made of an aluminum material, and the base (51) and the outer edge portion (53) are integrally connected together. In addition, in the outside-compartment casing (50) of the variation, a quadrangular prism-like reinforcing portion (58) is formed in the outer edge portion (53). The reinforcing portion (58) extends from the upper end to the lower end of the outside-compartment casing (50) in the vertical direction. In the present variation, the reinforcing portion (58) is formed, thereby further improving stiffness of the casing unit (31) and the opening (14) of the trailer (11).

In the foregoing embodiment, in the attachment portion (60) where the side edge portion (14a) of the opening (14) of the trailer (11) and the casing unit (31) are connected together, the vertically-extending grooves (61) and the vertically-extending raised portions (62) are formed. However, as illustrated in, e.g., FIG. 10, horizontally-extending grooves (transverse grooves) (71) and horizontally-extending raised portions (transverse raised portions) (72) may be formed in an attachment portion (70) where the upper edge portion (17) of the opening (14) of the trailer (11) and the casing unit (31) are connected together, an attachment portion (80) where the lower edge portion (18) of the opening (14) of the trailer (11) and the casing unit (31) are connected together, or both of the attachment portions (70, 80).

Figure 10:
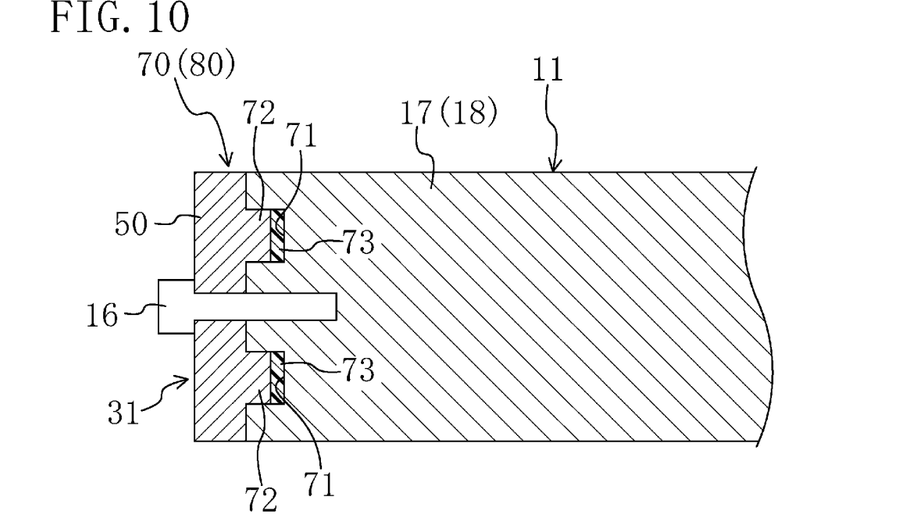
FIG. 10 is a longitudinal sectional view near an upper edge portion (lower edge portion) of a trailer in a trailer refrigerating apparatus of another variation.

Specifically, in, e.g., FIG. 10, two grooves (71) are formed in a front surface of the upper edge portion (17) of the casing unit (31). The groove (71) extends between the side edge portions (14a) at the right and left of the opening (14) of the trailer (11) in the horizontal direction, and is formed so as to have a rectangular longitudinal section. The two grooves (71) extend parallel to each other with a predetermined clearance.

On the other hand, in the example of FIG. 10, two raised portions (72) fitted into the grooves (71) are formed in the outside-compartment casing (50) of the casing unit (31). The raised portion (72) extends between right and left ends of the outside-compartment casing (50) in the horizontal direction, and is formed so as to have a rectangular longitudinal section. The two raised portions (72) extend parallel to each other with a predetermined clearance. That is, each of the raised portions (72) in the example of FIG. 10 also has a shape corresponding to each of the grooves (71) of the trailer (11), and is fitted into each of the grooves (71) when the casing unit (31) and the opening (14) of the trailer (11) are attached to each other.

In addition, in the example of FIG. 10, the bolts (16) are also provided in the middle between two pairs of the groove (71) and the raised portion (72). That is, the two grooves (71) or the two raised portions (72) extend in an arrangement direction of the plurality of horizontally-arranged bolts (16) so as to sandwich the plurality of bolts (16).

Further, in the example of FIG. 10, a sealing member (transverse sealing member) (73) is also interposed between each of the grooves (71) and each of the raised portions (72) with the casing unit (31) being attached to the opening (14) of the trailer (11). As the sealing member (73), e.g., packing or a silicon seal is used. The sealing member (73) prevents cool air of the in-compartment space (13) of the trailer (11) from leaking to the outside of the compartment through a clearance between the upper edge portion (17) or the lower edge portion (18) of the trailer (11) and the outside-compartment casing (50).

As described above, in the example of FIG. 10, since the grooves (71) and the raised portions (72) are also formed in the upper edge portion (17) and the lower edge portion (18) of the trailer (11), not only strength of the attachment portion in the transverse direction but also strength of the attachment portion in the longitudinal direction can be improved. A sealing property between the opening (14) of the trailer (11) and the casing unit (31) can be further improved, thereby ensuring prevention of the cool air leakage.

In the foregoing embodiment, the grooves (61, 71) are formed in the trailer (11), and the raised portions (62, 72) are formed in the casing unit (31). However, the raised portions (62, 72) may be formed in the trailer (11), and the grooves (61, 71) may be formed in the casing unit (31).

Note that the foregoing embodiment has been set forth merely for purposes of preferred examples in nature, and is not intended to limit the present invention or the application or scope thereof

INDUSTRIAL APPLICABILITY

As described above, the present invention is useful for the trailer refrigerating apparatus for cooling the in-compartment space of the trailer.

DESCRIPTION OF REFERENCE CHARACTERS

11 Trailer
13 In-Compartment Space
14 Opening
14a Side Edge Portion
17 Upper Edge Portion
18 Lower Edge Portion
25 Evaporator (Cooling Section)
31 Casing Unit (Casing)
60 Attachment Portion
61 Groove (Longitudinal Groove)
62 Raised Portion (Longitudinal Raised Portion)
63 Sealing Member (Longitudinal Sealing Member)
70 Attachment Portion
71 Groove (Transverse Groove)
72 Raised Portion (Transverse Groove)
73 Sealing Member (Transverse Sealing Member)

The invention claimed is:

1. A trailer refrigerating apparatus, comprising:
a casing configured to cover an opening of a trailer by attaching to vertical and horizontal edge portions of the trailer defining the opening, each vertical and horizontal edge portion being defined by a panel having a finite thickness;
a plurality of horizontally-arranged fastening members;
a plurality of vertically-arranged fastening members; and
a cooling section supported by the casing and configured to cool air of an in-compartment space of the trailer, wherein
in a vertical attachment portion where a vertical side edge portion of the opening of the trailer and the casing are connected together, the casing has formed therein at least two grooves spaced apart a distance which is less than the finite thickness of the panel defining the vertical side edge portion, the grooves having a predefined depth and extending parallel to the vertical side edge portion so as to receive at least two raised portions formed in and extending from and along the panel defining the vertical side edge portion of the trailer,
each of the two raised portions is in the shape of a prism having a rectangular transverse cross section and each of the two grooves forms therein a rectangular shaped space, and
two or more of the plurality of vertically-arranged fastening members are provided between the parallel grooves and at least two raised portions.

2. The trailer refrigerating apparatus of claim 1, wherein in a horizontal attachment portion where a horizontal upper or lower edge portion of the opening of the trailer and the casing are connected together, the casing has formed therein at least two grooves spaced apart a distance which is less than the finite thickness of the panel defining the horizontal upper or lower edge portion, the grooves having a predefined depth and extending parallel to the horizontal upper or lower edge portion so as to receive at least two raised portions formed in and extending along the panel defining the horizontal upper or lower edge portion of the trailer.

3. The trailer refrigerating apparatus of claim 1 or 2, further comprising:
a sealing member provided between the groove and the raised portion.

4. The trailer refrigerating apparatus of claim 1, wherein the plurality of fastening members are bolts.

5. A trailer refrigerating apparatus, comprising:
- a casing configured to cover an opening of a trailer by attaching to vertical and horizontal edge portions of the trailer defining the opening, each vertical and horizontal edge portion being defined by a panel having a finite thickness;
- a plurality of vertically-arranged fastening members; and
- a cooling section supported by the casing and configured to cool air of an in-compartment space of the trailer, wherein
- in an attachment portion where a vertical side edge portion of the opening of the trailer and the casing are connected together, the casing has formed therein at least two raised portions spaced apart a distance which is less than the finite thickness of the panel defining the vertical side edge portion, the two raised portions protruding from the casing a predefined depth and extending parallel to the vertical side edge so as fit into at least two grooves formed in and extending along the panel defining the vertical side edge portion of the trailer,
- each of the at least two raised portions is in the shape of a prism having a rectangular transverse cross section and each of the at least two grooves forms therein a rectangular shaped space, and
- the plurality of vertically-arranged fastening members are provided between the at least two raised portions that extend parallel to the vertical side edge.

6. The trailer refrigerating apparatus of claim 5, wherein in a horizontal attachment portion where a horizontal upper or lower edge portion of the opening of the trailer and the casing are connected together, the casing has formed therein at least raised portions spaced apart a distance which is less than the finite thickness of the panel defining the horizontal upper or lower edge portion, the two raised portions having a predefined depth and extending parallel to the horizontal upper or lower edge portion so as to fit into at least two grooves formed in and extending along the panel defining the horizontal upper or lower edge portion of the trailer.

7. The trailer refrigerating apparatus of claim 5 or 6, further comprising:
- a sealing member provided between the groove and the raised portion.

8. The trailer refrigerating apparatus of claim 5, wherein the plurality of fastening members are bolts.

* * * * *